3,047,629
PROCESS OF PREPARING CYCLOHEXANONE AND CYCLOHEXANOL
Johannes W. M. Steeman, Beek, Netherlands, assignor to Stamicarbon N.V., Heerlen, Netherlands
No Drawing. Filed Jan. 22, 1960, Ser. No. 4,017
5 Claims. (Cl. 260—586)

The present invention relates to an improved process for preparing cyclohexanone and cyclohexanol by oxidation of cyclohexane with a gas-containing oxygen.

The oxidation of cyclohexane, which may be carried out with the aid of dissolved metal compounds, such as cobalt and/or manganese compounds, as catalysts, is usually continued until part of the cyclohexane, e.g. 10–20% has been oxidized. In addition to cyclohexanone and cyclohexanol, other products, such as adipic acid and other dicarboxylic and monocarboxylic acids, and esters of these acids with, e.g. cyclohexanol are formed in this oxidation. These other products present certain problems because, to obtain the highest possible yield of cyclohexanol, it is necessary to saponify the cyclohexanol esters. In addition, the acids which are formed must be removed.

It has previously been proposed (see British Patent No. 820,435) to remove these acids by extracting the oil obtained in the oxidation with an aqueous sodium hydroxide solution, and subsequently recovering the cyclohexanol and cyclohexanone from the oil by extracting the oil with an aqueous solution of sodium toluene sulphonate. The non-extracted part of the oil, mainly consisting of cyclohexane and also containing the esters, is returned to the oxidation zone, the esters, if desired, being first removed by treatment with concentrated sulphuric acid. However, one objection to this prior process is that very extensive extraction apparatus is needed.

It has also been previously proposed (see German Patent No. 862,451) to subject the oil formed in the oxidation, after the non-converted cyclohexane has been distilled from it, to saponification with sodium hydroxide solution, after which the cyclohexanol and cyclohexanone are distilled by means of steam. Subsequently, the cyclohexanone-cyclohexanol mixture may be further purified by distillation and, if desired, separated into the desired components. However, in this method, condensation products of cyclohexanone are formed during saponification with the sodium hydroxide solution so that the process is not economically desirable. As a result, it has been proposed (see German Patent No. 969,501) to carry out the saponification with sodium hydroxide solution in the presence of the non-converted cyclohexane. This, however, has the drawback that the saponifying reaction must be carried out in relatively large reaction vessels. Moreover, there is the drawback that, in case the saponifying reaction is to be carried out at a temperature above the boiling point of the cyclohexane-water azeotrope (about 68° C.), these large reaction vessels must be operated at superatmospheric pressure.

If the saponification is carried out with a solution of an alkali carbonate, e.g. a soda solution, no cyclohexanone losses occur. However, the saponification does not proceed completely, not even in the case where a large amount of a relatively concentrated soda solution (e.g. one part by volume of 20%-by-weight soda solution per part by volume of cyclohexane free oil) is used for a long time at a high temperature (e.g. four hours at 95° C.). A still higher reaction temperature is unattractive, as at about 96° C. an azeotrope mixture of cyclohexanone and water distills over at atmospheric pressure. Consequently, with soda, which in itself has the advantage of being cheaper than sodium hydroxide, it is not possible to saponify the esters completely or at least essentially completely and this is necessary if the cyclohexanone and cyclohexanol products are to be converted into caprolactam in the usual way.

The principal object of the present invention is the provision of an improved process whereby the abovementioned difficulties are obviated. Another object of the invention is to provide a process by which, in the absence of non-converted cyclohexane, an almost complete saponification of esters may be effected with a minimum of cost. Other objects and advantages of the invention will also be hereinafter apparent.

According to the present invention, the improved process for preparing cyclohexanone and cyclohexanol by the oxidation of cyclohexane with a gas-containing oxygen comprises taking the oil obtained in the oxidation step and removing completely, or at least essentially completely, all of the unconverted cyclohexane therefrom, thereafter treating the cyclohexane-freed oil at a temperature of 70–96° C. with an aqueous solution showing a basic reaction, and then steam distilling the oil to separate a mixture of cyclohexanone and cyclohexanol therefrom, the treatment with aqueous basic solution comprising first treating the oil with an aqueous solution of a member of the group consisting of potassium and sodium carbonates and after the greater part (e.g. 75 to 95% by volume) of the carbon dioxide thus formed has escaped, treating the oil with an aqueous solution of a member of the group consisting of sodium and potassium hydroxide in an amount such that the hydroxide concentration of the resulting water layer is between 0.05–2 mg. eq./g.

It has been found that allowing the carbon dioxide resulting from the carbonate treatment to escape has the advantage that the required amount of hydroxide is restricted to a minimum. This release of carbon dioxide gas may be effected in several ways. For example, during or after the treatment with carbonate, a gas typically nitrogen may be passed through the oil, the gas serving to entrain the carbon dioxide. It is also possible to carry out the saponification reaction at such a temperature (e.g. 95 to 96° C.) that an azeotropic mixture of cyclohexanone and water is distilled over and thus entrains the carbon dioxide.

In order to obtain adequate saponification of the esters in the oil, it has been found necessary that the hydroxide concentration of the water layer formed in the extraction with hydroxide be at least 0.05 mg. eq./g. Additionally, if the hydroxide concentration is higher than 2 mg. eq./g., there is the risk that condensation reactions will be started which lower the yield of cyclohexanone.

It has also been found advantageous to carry out the process of the invention in such a way that the treatment with the aqueous carbonate solution is performed continuously in one or more steps so that at most 0.1 mg.eq./g. of acid or base is needed to make the water layer prior to hydroxide treatment react neutral with respect to phenolphthalein. Thus, if so much carbonate solution is added that more than 0.1 mg.eq./g. of acid is needed to give a neutral reaction, it appears that the extra amount of carbonate does not contribute to the saponification of the esters, and consequently is wasted. Additionally, the amount of hydroxide needed to reduce the ester content to a given low value is larger. On the other hand, the use of such a small amount of carbonate that more than 0.1 mg.eq./g. of base is needed, results in the increased and undesired consumption of the more expensive hydroxide.

The process according to the invention is preferably carried out in such a way that the two layers formed in the treatment with hydroxide are subjected to steam distillation, after which the residue from this distillation is burnt and the carbonate formed in this combustion is at least partly returned to the process. If desired, part of the carbonate formed in the combustion may be calcined and used in the treatment with hydroxide. Thus, the materials needed for the saponification may be circulated with only sufficient base being added to make up for losses.

The following example illustrates, but does not limit, the invention:

An oil which has been obtained by oxidation of cyclohexane and from which the non-converted cyclohexane has almost completely been removed by distillation, was passed, together with the following solutions showing a a basic reaction, through four successive reaction vessels provided with stirrers and reflux coolers and heated at about 95° C., at the rate of 100 kg. per hour. The residence time in the first reaction vessel was one hour, and in each of the other reaction vessels, fifteen minutes.

In Test $a$ mentioned in the table below, a 20%-by-weight sodium carbonate solution was supplied to the first reaction vessel at the rate of about 70 litres per hour.

In Test $b$, a solution containing 5%-by-weight of sodium hydroxide and 20%-by-weight of sodium carbonate was supplied to the first reaction vessel at the rate of about 50 liters per hour.

In Test $c$, a 20%-by-weight solution of sodium carbonate was supplied to the first reaction vessel at the rate of about 40 liters per hour, while a 30%-by-weight solution of sodium hydroxide was supplied to the second reaction vessel at the rate of about 7.5 liters per hour. The aqueous phase in the first reaction vessel gave an almost neutral reaction with phenolphthalein, while the hydroxide concentration of the aqueous phase in the fourth reaction vessel, likewise measured at room temperature with respect to phenolphthalein, was 0.5 mg.eq./g.

The liquids leaving the fourth reaction vessel were subjected to steam distillation, after which the ester content of the resulting distillate was determined in the usual way. Results are given in the following table:

The acid and ester contents of the oil supplied to the first reaction vessel were about 1.5 and 0.8 mg.eq./g. respectively.

Table

| Test | Substance showing a basic reaction | Ester Content, mg.eq./g. |
|---|---|---|
| a | $Na_2CO_3$ | 0.07 |
| b | $NaOH+Na_2CO_3$ supplied simultaneously | 0.07 |
| c | $Na_2CO_3+NaOH$ supplied successively | <0.01 |

The figures of the above table illustrate that if, contrary to the present process, $Na_2CO_3$ alone (Test $a$) or a mixture of $NaOH+Na_2CO_3$ (Test $b$) is used, the ester content is inadmissibly high.

If the process according to the invention is used (Test $c$), the ester content is nil, or at least lower than 0.01 mg.eq./g. The cyclohexanone loss, measured with an accuracy of 1%, is also nil. The ester content is again higher, if, in contrast to the preferred embodiment of the invention, so much soda is added, that more than 0.1 mg.eq./g. of acid has to be added to the aqueous phase in the first reaction vessel to make it react neutral with phenolphthalein. The ester content may again be reduced to below 0.01 mg.eq./g. by adding more sodium hydroxide. In this case, however, there is a loss of both soda and sodium hydroxide.

Obviously, the reaction conditions mentioned in the foregoing example may be varied in many ways. For example, a greater or smaller number of reaction vessels may be used, other temperature and pressures may be applied, etc. It is also possible to supply part of the alkali hydroxide separately to the third or fourth reaction vessel, or to the steam distillation column. Accordingly, the scope of the invention is defined in the following claims wherein I claim:

1. In a process for preparing cyclohexanone and cyclohexanol by oxidizing cyclohexane with a gas-containing oxygen whereby an oil containing cyclohexanone, cyclohexanol and unconverted cyclohexane is obtained, unconverted cyclohexane is thereafter essentially completely removed from said oil and the oil is then heated at a temperature of 70–96° C. with an aqueous alkaline solution after which a mixture of cyclohexanone and cyclohexanol is separated from the oil by steam distillation, the improvement wherein the treatment with the alkaline aqueous solution is carried out in two steps, first with an aqueous solution of a carbonate selected from the group consisting of sodium and potassium carbonate and thereafter, after the greater part of the resulting carbon dioxide has escaped from the oil, with an aqueous solution of a hydroxide selected from the group consisting of potassium and sodium hydroxides, in amount such that the hydroxide concentration in the water layer resulting from said treatment is from 0.05 to 2 milligram equivalents per gram.

2. The process of claim 1 wherein the treatment with carbonate solution is performed continuously.

3. The process of claim 1 wherein the treatment with carbonate solution is performed continuously in at least one step such that at most 0.1 milligram equivalent per gram of neutralizing agent is needed to make the water layer prior to the hydroxide treatment react neutral with respect to phenolphthalein.

4. The process of claim 1 wherein after said treatment with carbonate and hydroxide, the resulting oil and water layers are steam distilled, and the undistilled residue is burnt to form carbonate, the carbonate thus formed being at least partially recycled for use in said process.

5. In a process for preparing cyclohexanone and cyclohexanol by oxidizing cyclohexane with a gas-containing oxygen and removing unconverted cyclohexane from the resulting oil containing the desired cyclohexanone and cyclohexanol, the improvement of thereafter treating said oil with an aqueous carbonate solution selected from the group consisting of aqueous potassium and sodium carbonate solution at 70–96° C., allowing the greater part of the resulting carbon dioxide to escape from said oil, then treating said oil with an aqueous hydroxide selected from the group consisting of aqueous sodium and potassium hydroxide solutions, and thereafter steam distilling the resulting oil and water layers to recover a distillate mixture of cyclohexanone and cyclohexanol, the amount of hydroxide utilized being such that the hydroxide concentration of the water layer is 0.5–2 milligram equivalents per gram after said treatment and the amount of carbonate being such that at most 0.1 milligram equivalents per gram of neutralizing agent is needed to make the water layer prior to hydroxide treatment neutral with respect to phenolphthalein.

References Cited in the file of this patent
UNITED STATES PATENTS 2,931,834 Crouch et al. _____ Apr. 5, 1960
2,938,924 Simon et al. _____ May 31, 1960

UNITED STATES PATENT OFFICE
CERTIFICATE OF CORRECTION

Patent No. 3,047,629            July 31, 1962

Johannes W. M. Steeman

It is hereby certified that error appears in the above numbered patent requiring correction and that the said Letters Patent should read as corrected below.

In the heading to the printed specification, between lines 6 and 7, insert -- Claims priority, application Netherlands Jan. 26, 1959 --.

Signed and sealed this 26th day of March 1963.

(SEAL)
Attest:

ESTON G. JOHNSON            DAVID L. LADD

Attesting Officer            Commissioner of Patents